UNITED STATES PATENT OFFICE.

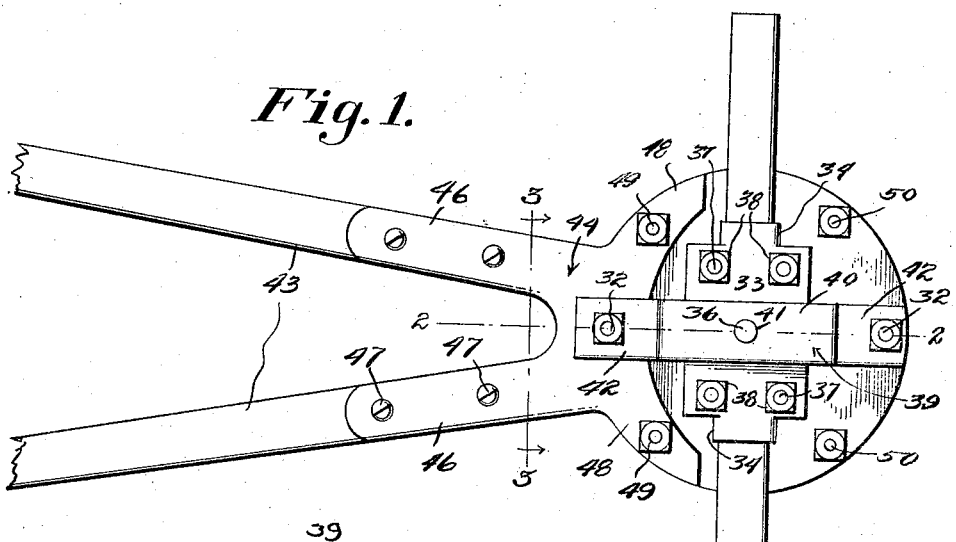

GEORGE L. BUMGARDNER, OF GRIDLEY, KANSAS, ASSIGNOR OF ONE-HALF TO HARRY A. PARTRIDGE, OF GRIDLEY, KANSAS.

VEHICLE-COUPLING.

1,307,344.             Specification of Letters Patent.        Patented June 24, 1919.

Application filed January 25, 1918.   Serial No. 213,730.

*To all whom it may concern:*

Be it known that I, GEORGE L. BUMGARDNER, a citizen of the United States, residing at Gridley, in the county of Coffey, State of Kansas, have invented certain new and useful Improvements in Vehicle-Couplings; and I do hereby declare the following to be a full, clear, and exact description of the invention, such as will enable others skilled in the art to which it appertains to make and use the same.

This invention is an improvement in couplers for vehicle running gears and has particular reference to a bolster construction.

An object of the invention is to provide an improved construction wherein a pivotal connection is provided between the usual bolster of the running gear of the vehicle and the sand-board and axle thereof and the use of king bolts obviated thereby.

The inventive idea involved is capable of receiving a variety of mechanical expressions some of which, for the purpose of illustrating the invention, are shown in the accompanying drawings wherein:—

Figure 1 is a top plan view of one form of the invention.

Fig. 2 is a longitudinal section on the line 2—2 of Fig. 1.

Fig. 3 is a transverse section on the line 3—3 of Fig. 1.

Referring to the drawings and more particularly to Figs. 1 to 3 inclusive, the numeral 11 indicates the usual axle of the running gear of a vehicle upon which is superimposed, in this instance, the sand-board 12 and these parts are so connected as to be movable relative to the bolster 13. Preferably interposed between the sand-board 12 and bolster 13 is a pair of horizontally arranged and superposed retaining plates 14 and 15 held in spaced relation by an annular ring member 16 engaged around the outer peripheries of said plates and forming therewith a guide channel 17. The lower plate 15 is provided with a central opening 18 for receiving the lower portion 19 of a circular guide plate 20 the upper portion of which is of a larger diameter than the portion 19 whereby the periphery of the plate will engage in the channel 17 between the plates 14 and 15. Extending centrally from the guide plate 20 and into the lower portion of the bolster 13 is a large pivot stud 21 about which the plate 20 revolves when the axle 11 and sand-board 12 are moved relatively to the bolster. The plate 20 is preferably secured to the axle 11 and for this purpose there is provided a clamping plate or member 22 engageable with the bottom of the axle and provided with the upturned lugs 23 which clamp against the sides of the axle and said plate is enlarged at its center to extend beyond said sides so as to receive therethrough the lower ends of securing bolts 24 arranged on each side of the axle and sand-board and having their heads countersunk in the upper surface of the plate 20. Nuts 25 are used to secure the bolts to the plate 22 and the central portion of this plate is provided with a depending pivot stud 26 in vertical alinement with the stud 21. A substantially U-shaped yoke member 27 has its bight portion 28 disposed beneath the axle 11 and provided intermediate its ends with a bearing 29 having a socket 30 therein for receiving the pivot stud 26 and in this manner it will be apparent that the guide plate 20 is provided with vertically alined pivots whereby the same may be rotated concentrically with respect to the retaining plates 14 and 15. The upper ends of the yoke 27 are provided with laterally extending ends 31 which are secured to the under side of the plate 15 by means of fastening bolts 32 which also extend through the plates 14 and 15 and the ring member 16.

The bolster 13 also preferably has associated therewith a clamping plate 33 similar in construction to the clamping plate 22 and provided with lugs 34 which engage the opposite sides of the bolster and said plate 33 is adapted to have interposed between the same and the upper edge of the bolster one of the spring members 35 of the vehicle. The longitudinal edges of the plate 33 extend beyond the sides of the bolster 13, as clearly shown in Fig. 2 and extending upwardly from the center of the plate is a stud 36. The clamping plate 33 is connected to the upper plate 14 by means of fastening bolts 37 which have their heads countersunk in the under surface of the plate 14 and which extend upwardly on each side of the bolster 13 and through the plate 33 to which they are secured by the nuts 38. An upper inverted yoke or arched member 39 is provided in its bight portions 40 with an opening 41 for receiving the pivots 36 and the laterally extending ends 42 of the yoke member are secured by the bolts 32. Through the medium of this construction it will be apparent that the retaining plates 14 and 15 are rigidly connected to the bolster and there will be permitted a relative movement between the axle and sand-board with respect to the bolster when the vehicle is turned.

A reach member including a pair of rearwardly diverging arms 43 have their forward ends connected by the upper and lower reinforcing elements 44 and 45, respectively, the former consisting of the rearwardly extending and diverging arms 46 secured to the reach member by means of bolts or other fasteners 47 while the forward portion of the element 44 has the outwardly curved arms 48 which are secured to the plates 14 and 15 and the ring member 16 by means of bolts 49 and the central portion of said element is interposed between the upper plate 14 and the rear end 42 of the yoke member 39 and have the bolts 32 passing therethrough, as clearly shown in Fig. 2. The lower reinforcing element 45 is also secured to the reach members 43 by means of the bolt 47 and the forward end of said element 45 is interposed between the lower plate 15 and the rear bent end 31 of the yoke member 27 and is secured in such position by having the rear bolt 32 passed therethrough. The plates 14 and 15 and ring member 16 may be further secured together by means of bolts 50.

What is claimed is:—

1. In an apparatus of the character described, the combination with an axle, a sand-board and a bolster, of superposed retaining plates mounted between two of the first named elements, a guide plate having a portion mounted between said retaining plates and between which plates and the guide plate there is relative movement, means connecting said guide plate to one of the first named elements, and a pivot stud extending through said guide plate and about which certain of the plates are revoluble.

2. In an apparatus of the character described, the combination with an axle, a sand-board, and a bolster; superposed retaining plates mounted between the sand-board and bolster and secured to the latter, a guide plate having a portion interposed between said retaining plates, means for securing said guide plate to said sand-board and axle, a yoke member secured to said retaining plates and having a portion disposed beneath said axle and provided with a bearing, and a pivot secured to the axle and engaged in said bearings.

3. In an apparatus of the character described, the combination with an axle, a sand-board, and a bolster; superposed retaining plates mounted between the sand-board and bolster, a guide plate having a portion interposed between said retaining plates, a clamping plate secured to the bolster for fastening a vehicle spring thereto, fastening bolts disposed on each side of the bolster and connecting said retaining plates to said clamping plates, a second clamping plate secured to said axle and having a pivot stud, bolts connecting said guide plate with said second clamping plate, and a yoke member secured to said retaining plates and having a bearing in which said stud is pivotally engaged.

4. In an apparatus of the character described, the combination with an axle, a sand-board, and a bolster; superposed retaining plates mounted between the sand-board and bolster, a guide plate having a portion interposed between said retaining plates, a clamping plate secured to the bolster for fastening a vehicle spring thereto, fastening bolts disposed on each side of the bolster and connecting said retaining plates to said clamping plates, a second clamping plate secured to said axle and having a pivot stud, bolts connecting said guide plates with said second clamping plate, a yoke member secured to said retaining plates and having a bearing in which said stud is pivotally engaged and a reach member secured to said retaining plates.

In testimony whereof I affix my signature in the presence of two witnesses.

GEORGE L. BUMGARDNER.

Witnesses:
  M. B. Crow,
  H. C. Haas.

Copies of this patent may be obtained for five cents each, by addressing the "Commissioner of Patents, Washington, D. C."